(12) United States Patent
Jaramillo et al.

(10) Patent No.: US 7,984,375 B1
(45) Date of Patent: Jul. 19, 2011

(54) AUTOMATED DETECTION AND IMPLEMENTATION OF STATE AND OBJECT MODIFICATIONS

(75) Inventors: Narciso B. Jaramillo, Oakland, CA (US); Mark E. Shepherd, Tiburon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1312 days.

(21) Appl. No.: 11/546,004

(22) Filed: Oct. 10, 2006

(51) Int. Cl.
*G06F 17/00* (2006.01)
*G06F 17/21* (2006.01)
*G06F 17/24* (2006.01)
*G06F 9/44* (2006.01)

(52) U.S. Cl. .................. 715/255; 715/229; 717/110
(58) Field of Classification Search .............. 715/229, 715/255; 717/110, 168
See application file for complete search history.

(56) References Cited

U.S. PATENT DOCUMENTS

| | | | | |
|---|---|---|---|---|
| 6,848,078 | B1* | 1/2005 | Birsan et al. | 715/206 |
| 7,131,066 | B1* | 10/2006 | Birsan et al. | 715/206 |
| 2003/0167285 | A1* | 9/2003 | Kumar et al. | 707/200 |
| 2003/0237046 | A1* | 12/2003 | Parker et al. | 715/513 |
| 2004/0103373 | A1* | 5/2004 | Wei | 715/513 |
| 2005/0155014 | A1* | 7/2005 | Andrade et al. | 717/105 |
| 2006/0145896 | A1* | 7/2006 | Venkatesan et al. | 341/50 |
| 2006/0200535 | A1 | 9/2006 | Moser | |
| 2006/0288344 | A1* | 12/2006 | Brodersen et al. | 717/168 |

OTHER PUBLICATIONS

Kevin Koch, Creating a Stateful Web Service, 2005, ASP.NET—Premium Content—DNzone.com, pp. 1-2.*
Adobe, "XML Forms Architecture (XFA) Specification" Version 2.4, Sep. 11, 2006.
Parker, Thom, "Moving from Acrobat to LiveCycle Designer JavaScript", pp. 1-36, PDF Conference produced by Carl Young.
XML Forms Architecture (XFA), pp. 1-3, http://xml.coverpages org/xfa.html, Jun. 16, 1999.
McKenzie, Gavin F. ,XFA-Template Version 1.0, pp. 1-174, http://www.w3.org/1999/05/XFA/xfa-templeate.

* cited by examiner

*Primary Examiner* — Chau Nguyen
(74) *Attorney, Agent, or Firm* — Kilpatrick Townsend & Stockton LLP

(57) ABSTRACT

Automatic detection and implementation of modifications to an application are described. A new base model of the application is generated using the edited version of the application. This base model is simulated to a selected state, resulting in a new presentation model that includes a tree of multiple objects described by the new base model at the selected state, and a pointer for each node of the tree that points back to the associated node in the new base model. The pointers of each node of the new presentation model are compared to the nodes of the previous presentation model of the application and then replaced with those corresponding nodes in the previous presentation model when the nodes are equivalent. Otherwise, the nodes of the new presentation model are maintained.

12 Claims, 5 Drawing Sheets

AUTOMATED DETECTION AND IMPLEMENTATION OF STATE AND OBJECT MODIFICATIONS

TECHNICAL FIELD

The present invention is related, in general, to application development environments (ADEs) and, more particularly, to detecting and implementing object and state modifications.

BACKGROUND

Modern web applications are typically written in both declarative and procedural code. In a typically application, the initial appearance of objects in the user interface can be defined using declarative code. However, in order to define how that interface changes over time—for example, how elements appear or are modified in response to user interaction—procedural code is generally used. In implementing such applications, the declarative and procedural parts may be defined using two different computer languages, such as Extensible Markup Language (XML), Hypertext Markup Language (HTML), Adobe Systems Incorporated's CFML™, and the like, for defining the declarative part, and such as Netscape Communications and Weblogs, Inc.'s JAVASCRIPT™, Sun Microsystems Inc.'s JAVA®, C++, and the like, for defining the procedural part.

Another technology allows for the declarative and procedural aspects to be defined by the same language. One language that provides for such a dual role is Adobe Systems Incorporated's MXML™. MXML™ is an Extensible Markup Language (XML)-based language used to describe Rich Internet Applications (RIAs), which are interactive, multimedia, applications that may run on client-side players or within client-side process containers, for example, Adobe System Incorporated's FLASH® player. FLEX™ and FLEX BUILDER™, both available from Adobe Systems Incorporated, utilize MXML™ to describe RIAs. FLEX™ is a presentation layer technology that, along with its application development environment (ADE), FLEX BUILDER™, are used to create RIAs. MXML™ is a tag-based markup language for describing applications. It is practically unique because while it is a declarative tag-based markup language, it not only describes the appearance of a particular web application, it can also describe the procedural logic as well. MXML compiles into ACTIONSCRIPT™, which is a procedural language from Adobe Systems Incorporated native to the FLASH® environment. Therefore, a direct relationship exists between the MXML™ markup and the ACTIONSCRIPT™ code.

The MXML™ markup defines both the initial appearance of the application (as in other declarative user interface languages) and the appearance of other states of the application that can be shown at different times (as in other procedural-type languages). For example, the application may initially show a list of products; when the user chooses a product, the list of products may shrink over to one side, and the selected product may be expanded to show more detail. In an ordinary application, the initial screen could be described declaratively, but the process of shrinking the list of products to one side and expanding the selected product would typically be described using procedural code. In MXML, both the initial screen and the "expanded product" screen can be defined as declarative states; the state syntax describes how the screen needs to change in order to go from one state to the next.

ADEs are software tools that allow a developer (e.g., a web developer, application developer, and the like) to create web pages, websites, interactive applications, and the like for use by end users (e.g., visitors to websites, application uses, and the like). Various ADEs exist in the current marketplace, such as DREAMWEAVER®, GOLIVE®, and FLEX BUILDER™ each available from Adobe Systems Incorporated of San Jose, Calif. DREAMWEAVER® and GOLIVE® are ADEs that allow web developers to design HTML web pages in both a code editor and a graphical-based design time environment. DREAMWEAVER® also allows the developer to design in other languages, such as, for example, ASP, CFML™, and the like. Much of a developer's job, whether creating a simple web page, a complex web application, or a RIA, is to create user interfaces (UIs) for the applications that are easy to use and enhance a user's experience.

When a developer is editing or creating a web application or RIA in an ADE, edits and changes to the application may either be directed to the initial appearance of the application or to a subsequent state. An ADE would typically have to interpret the underlying user interface code in order to present visual tools for manipulating the interface—for example, in a "What You See Is What You Get" (WYSIWYG) design view. When the states of an application are described procedurally, it is difficult for the ADE to interpret those states, and so developers can typically only edit the initial appearance of the application in the design view. Conversely, when the states of an application are described declaratively, as in MXML™, it is possible for the ADE to allow the developer to simulate and directly edit different states of the application in its design view. However, it can be difficult to do so efficiently, because a complex interpretation algorithm may be required to determine how an edit to the underlying declarative code affects the state currently being simulated in the design view. If the interpretation algorithm does not attempt to determine the minimal number of changes necessary to simulate the new appearance of the state based on the edit that occurred, the design view cannot be efficiently updated.

BRIEF SUMMARY

Various representative embodiments of the present invention are directed to systems, methods, and computer program products for automatically detecting and implementing modifications to an application. The ADE, in which the application is edited, maintains a base model and a stateful model of the application. The base model represents the actual code underlying the application, while the stateful model represents the appearance of the application in a particular state or how that particular state of the application is presented. Thus, the stateful model represents a single state of the application at one point in time. Each node in the stateful model includes a pointer to the associated node in the base model. When the developer enters edits to the application, a new base model of the edited application is created from the edited application. The new base model is then transformed into a new stateful model of the application for that particular state. The new stateful model will be sent to the clients of the model within the ADE to use in implementing the edits. However, in order to provide an efficient transition for those clients, it is beneficial to send a stateful model with a small number of changes from the previous model.

In order to generate a stateful model with the smallest number of changes, the new stateful model is processed further before it is transmitted to the client. The new stateful model is compared to the previous stateful model. To implement this comparison, the pointers of each node of the new stateful model are compared to the pointers of each node of the previous stateful model. When the two pointers point back to the same node in the base model, the two nodes are considered equivalent. The node in the new stateful model is replaced with the corresponding equivalent node in the previous stateful model. Otherwise, if the nodes are not equivalent, the nodes of the new stateful model are maintained. Once all of the nodes have been compared from the previous stateful model, the new stateful model contains each of the same nodes from the previous stateful model, except those necessary to reflect the edit changes. Therefore, when the new stateful model is transmitted to the model clients, only a minimum number of changes are sent.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
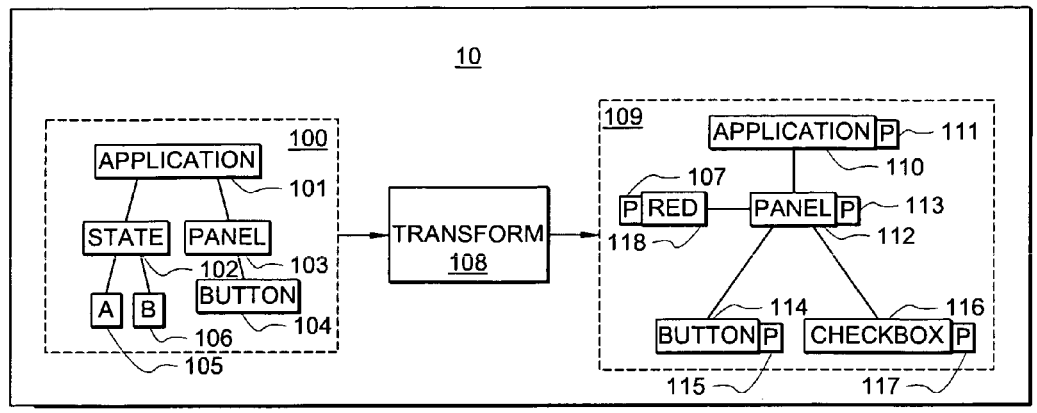
FIG. 1A is a block diagram illustrating an ADE configured according to one embodiment of the present invention.

FIG. 1A is a block diagram illustrating ADE 10 configured according to one embodiment of the present invention. ADE 10 illustrates the overall application modeling including base model 100 and stateful model 109 created by processing or simulating base model 100 through transform 108. Base model 100 includes the declarative model of the initial appearance of the interface, as well as the description of another state of the interface, state 102. Application node 101 is the root node of base model 100, it includes state node 102, which describes another state of the interface, and panel node 103, which defines the declarative part of the application interface. State node 102 includes two child actions, A-105 and B-106, while panel node 103 also has a child node, button node 104.

In the illustrated embodiment, stateful model 109 is an application simulation of state node 102 by transform 108. Through transformation of base model 100 at state node 102, stateful model 109 results in application node 110, panel node 112, which is now red, based on red property 107, button node 114, and checkbox 116. Although the application declares the initial state with panel 103 and button 104, the simulation of state node 102, having performed actions A-105 and B-106, transforms the initial state to include red property 107 and checkbox 116. In addition to the nodes in stateful model 109, each node includes a pointer that points back to the specific node in base model 100 that represents that state. For example, application node 110 includes pointer 111, which points back to application node 101. Some of the nodes in stateful model 109 may point back to the declarative part of the base model, while other nodes may point back to the model describing the derived states. By including the pointers, stateful model 109 remains associated with base model 100.

Figure 1B:
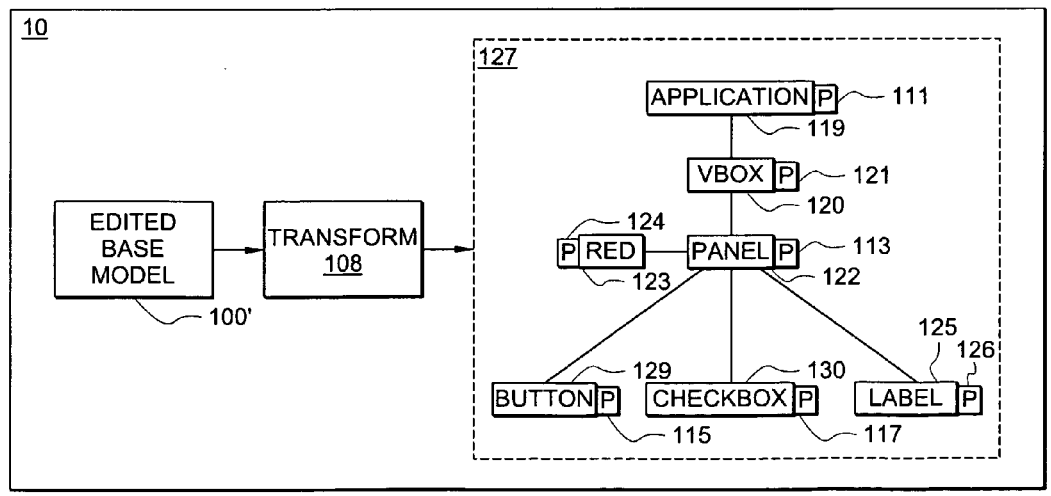
FIG. 1B is a block diagram illustrating an ADE configured according to one embodiment of the present invention.

FIG. 1B is a block diagram illustrating ADE 10 configured according to one embodiment of the present invention. The developer uses ADE 10 to create and modify applications or RIA. When modified, edited application model 100' is created based on any changes in the underlying procedural and/or declarative code. At this point in the edit process, ADE 10 does not know how the edits affect the stateful model, since these edits may have affected either the initial appearance described in the base model, the instructions in the description of the current state, or both. In order to properly construct the new stateful model transform 108 processes edited base model 100'. Therefore, the first step in the analysis is to create a new stateful model. To complete this task, edited application model 100' is simulated to the same state as stateful model 109 (FIG. 1A) by transform 108 to generate edited stateful model 127. Based on the developer's edits, edited stateful model 127 comprises application node 119 with pointer 111, VBox node 120 with pointer 121, panel node 122 with pointer 113, red property 123 with pointer 124, button node 123 with pointer 115, checkbox 130 with pointer 117, and label node 125 with pointer 126.

Figure 1C:
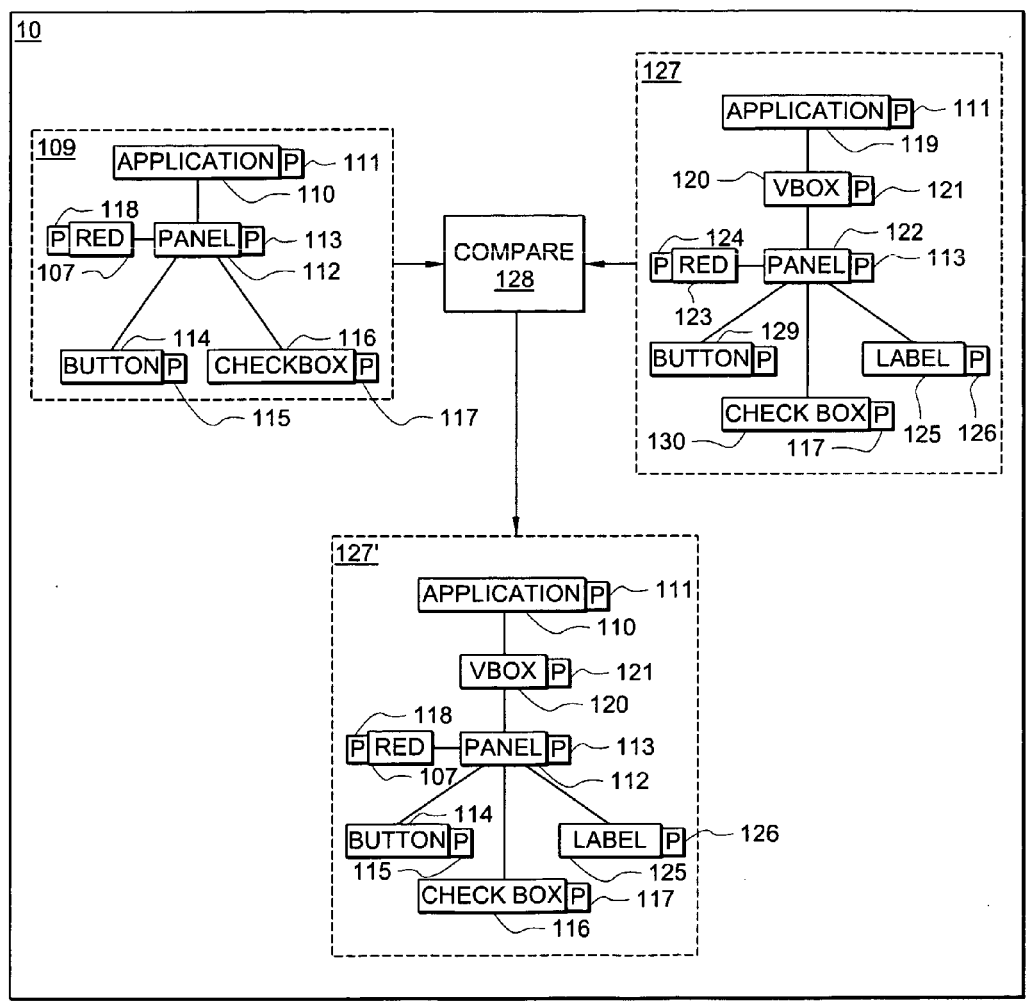
FIG. 1C is a block diagram illustrating an ADE configured according to one embodiment of the present invention.

FIG. 1C is a block diagram illustrating ADE 10 configured according to one embodiment of the present invention. In order to determine what changes have been made to the application, ADE 10 uses compare module 128 to compare edited stateful model 127 with stateful model 109 node-by-node. Compare module 128 begins by comparing application node 119 with application node 110. The actual comparison of the two nodes is performed by comparing each node's pointers. If the pointers point back to the same node in base model 100 (FIG. 1A), then the two nodes are considered equivalent. In the illustrated embodiment, application node 110 and application node 119 each have the same pointer 111, which points back to application node 101 in base model 100. Therefore, compare module 128 determines that the two nodes are equivalent. However, instead of keeping application node 119 in edited stateful model 127, compare module 128 replaces application node 119 with application node 110. The only changes made are to the properties of application node 110, which are changed to conform to the values of the properties in the replaced application node 119. The resulting model, as illustrated in FIG. 1C, is referred to as edited stateful model 127'. This replacement and properties adjustment is performed so that any clients of stateful model 109 will already have a copy of at least some of the nodes making up edited stateful model 127'. Therefore, these clients will not have to change much of their data structures.

Compare module 128 then finds that the pairs panel node 112 and panel node 122, button node 114 and button node 123, and checkbox node 116 and checkbox 124 each have the same pointer 113, 115, and 117, respectively, which point back to panel node 103, button node 104, and action B-106, respectively. Panel node 112 and 122 also are both red, red property nodes 107 and 123. As such, compare module 128 replaces panel node 122 with panel node 112, button node 123 with button node 114, and checkbox node 130 with checkbox node 116 in edited stateful model 127'. Because the remaining nodes in edited stateful model 127 have no matches in stateful model 109, they both stay remain in final edited stateful model 127'. Thus, the changes entered by the developer are determined to be the state changes of adding a VBox, VBox node 120, and a label, label node 125.

The changes that were recorded into edited stateful model 127' need to be transmitted the clients of stateful model 109 so they can update their data structures appropriately. However, in order to more efficiently convey the changes, ADE 10 generates a change list which will be transmitted to the clients. ADE 10 monitors the comparison process and generates the change list for the activities that occur in that process. The nodes from edited stateful model 127' that were replaced by the nodes from stateful model 109 are not listed in the change list, since there would be no changes to make thereon. Nodes that relate to properties in edited stateful model 127' where the values of the properties were changed from stateful model 109 to edited stateful model 127', are added to the change list as modification nodes. Any of the nodes from edited stateful model 127' which were not replaced are added to the change list as added nodes. Finally, where nodes from stateful model 109 have no corresponding nodes in edited stateful model 127', those nodes are added to the change list as deleted nodes. When the change list is transmitted to the clients, the clients will have only the necessary instructions in how to update the model.

It should be noted that in additional and/or alternative embodiments of the present invention, edited stateful model 127' may be transmitted in full to the clients. In such embodiments, the clients would process the entire model to implement any changes.

Figure 2:
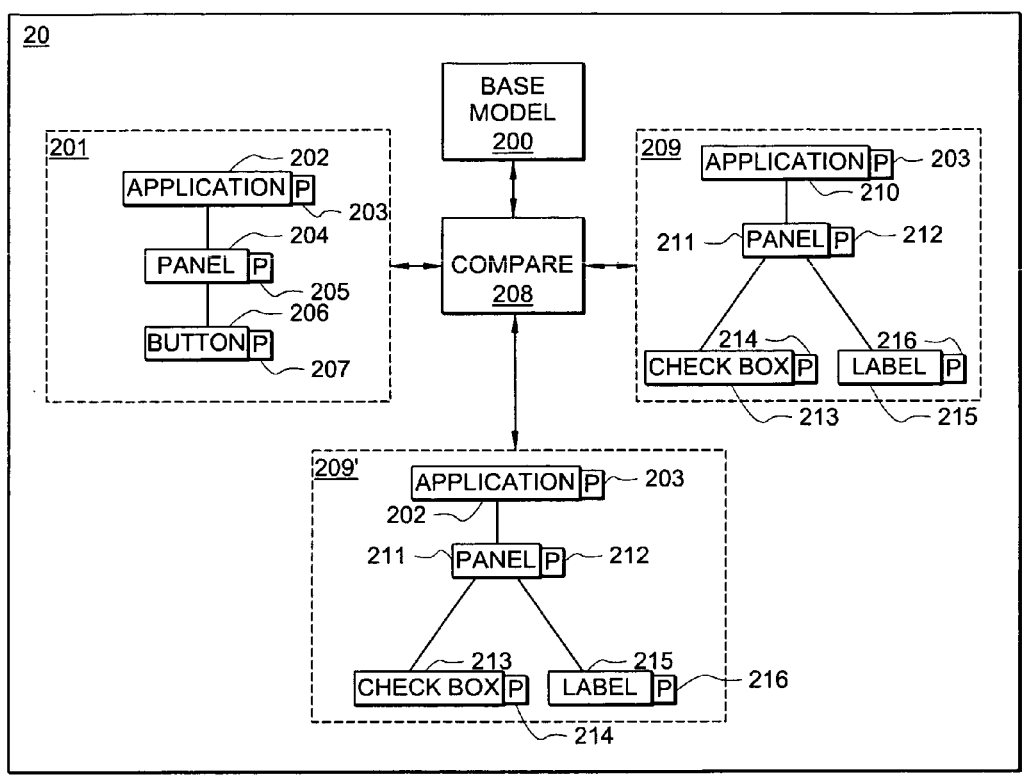
FIG. 2 is a block diagram illustrating an ADE configured according to one embodiment of the present invention.

FIG. 2 is a block diagram illustrating ADE 20 configured according to one embodiment of the present invention. Adding objects to states is not the only activity that the illustrated embodiment supports. The developer may delete and modify existing objects as well. After generating edited stateful model 209 from the developer's edits, ADE 20 uses compare module 208 to perform the node-by-node comparison with stateful model 201. In the illustrated embodiment, compare module 208 finds that application node 210 and application node 202 are equivalent. Thus, compare module 208 inserts previous application node 202 into edited stateful model 209'. However, when comparing panel 204 with panel 211, it discovers that edits have occurred because the new pointer, pointer 212, does not point to the same node in base model 200. Therefore, ADE 20 considers that panel node 204 has been modified. Thus, compare module 208 keeps panel node 211 in edited stateful model 209'. Moreover, button node 206 no longer has any corresponding node in edited stateful model 209'. Therefore, ADE 20 considers the button previously represented by button node 206 to be deleted. Edited stateful model 209' results in application node 202, panel node 211, checkbox node 213, and label node 215, each of nodes 213 and 215, being children of panel node 211.

It should be noted that additional and/or alternative embodiments of the present invention may be used to track edits to other processes that make transforms of an original group of code. For example, a What You See Is What You Get (WYSIWYG) XML editor may transform XML documents using extensible stylesheet language (XSL) into a presentation document. In the context of the additional and/or alternative embodiments of the present invention, the base model of the XML document is transformed by the XSL into a presentation model. Thus, the additional and/or alternative embodiments of the present invention could be used to calculate a minimal set of updates to the presentation model based on edits to the underlying XML document.

Figure 3:
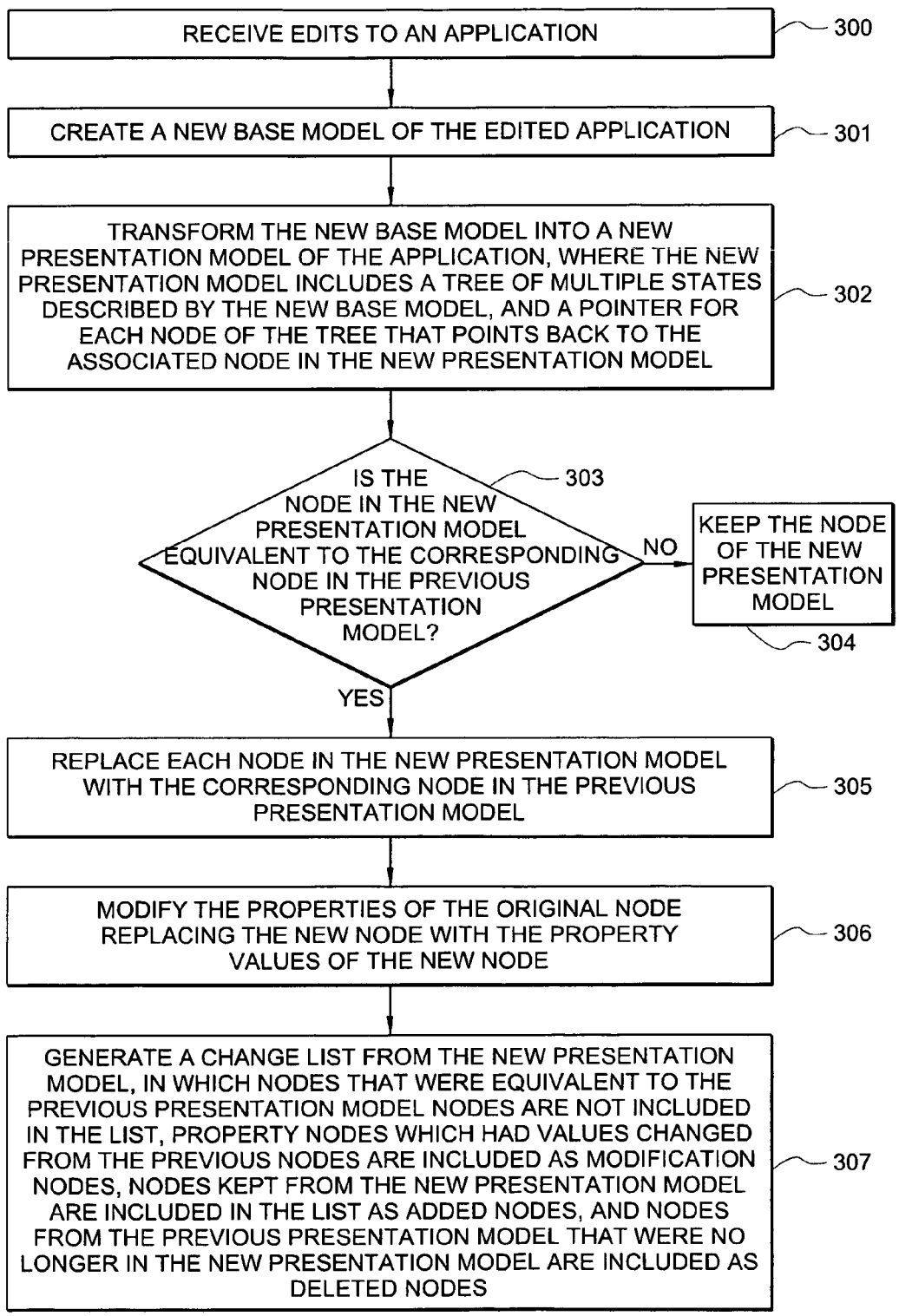
FIG. 3 is a flowchart illustrating example steps executed to implement one embodiment of the present invention.

FIG. 3 is a flowchart illustrating example steps executed to implement one embodiment of the present invention. In step 300, edits to an application are received. A new base model of the edited application is created in step 301. The new base model is simulated, in step 302, to create a new presentation model of the application, where the new presentation model includes a node tree describing a particular state of the application at a given time. Each node in the tree includes a pointer back to the associated node in the new base model. A determination is made in step 303 whether the node in the new presentation model is equivalent to the corresponding node in the previous presentation model. If not, then the node of the new presentation model is kept in step 304. If the nodes are equivalent, then each node in the new presentation model is replaced with the corresponding node from the previous presentation model in step 305. The properties of the original node replacing the new node are modified, in step 306, with the property values of the new node. A change list is generated, in step 307, from the new presentation model, in which nodes that were equivalent to the previous presentation model nodes are not included in the list, property nodes which had values changed from the previous nodes are included as modification nodes, nodes kept from the new presentation model are included in the list as added nodes, and nodes from the previous presentation model that were no longer in the new presentation model are included as deleted nodes.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 4:
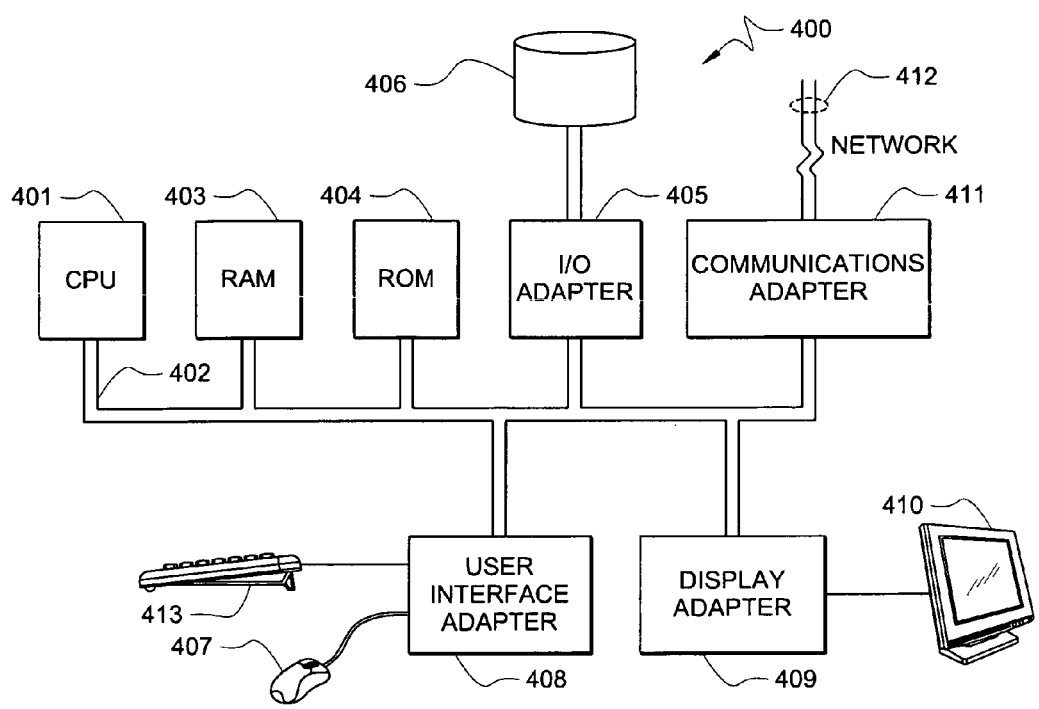
FIG. 4 illustrates a computer system adapted to use embodiments of the present invention.

FIG. 4 illustrates computer system 400 adapted to use embodiments of the present invention, e.g. storing and/or executing software associated with the embodiments. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects storage devices 406, such as one or more of a hard drive, a CD drive, a floppy disk drive, a tape drive, to computer system 400. The I/O adapter 405 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, and the like, to the computer system 400. The display card 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising a processor and a non-transitory computer-readable medium, wherein the non-transitory computer-readable medium embodies one or more program components that configure the computing system to carry out acts comprising:
   accessing, by an application development environment, code of an application;
   creating a first base model of the application using the code, the base model representing the underlying code of the application;
   after creating, receiving input defining a change to the code;
   in response to the change to the code, creating an edited base model of the application representing the underlying code of the application as changed;
   creating a new stateful model of the application by processing the edited base model using a transform to simulate the edited base model to a state, the new stateful model representing the appearance of the application when in the state;
   accessing a previous stateful model of the application, the previous stateful model representing a simulation of the first base model to the state and representing the appearance of the application, prior to the change, when in the state;
   comparing a node of the new stateful model to a corresponding node of the previous stateful model to identify a change between the new stateful model and the previous stateful model; and
   providing data identifying the change between the new stateful model and the previous stateful model to a client within the application development environment.

2. The computing system set forth in claim 1,
   wherein the base models are each defined using one or more nodes,
   wherein the previous and new stateful models are defined using one or more nodes and pointers, each node in the new stateful model having a pointer to a node in the edited base model and each node in the previous stateful model having a pointer to a node in the first base model,
   wherein comparing the node of the new stateful model to a corresponding node of the previous stateful model comprises determining if the pointer of the node of the new stateful model and the pointer of the corresponding node of the new stateful model point to the same node in a base model.

3. The computing system set forth in claim 2, wherein providing data identifying the change comprises providing a change list, the change list identifying at least one of:
   a new node, the new node being a node in the new stateful model that was not in the previous stateful model,
   a deleted node, the deleted node being a node in the previous stateful model that did not have a corresponding node in the new stateful model, or
   a modified node, the modified node being a node in the previous stateful model having a corresponding node in the new stateful model, but pointing to a different node in a base model.

4. The computing system set forth in claim 1, wherein the state is one of a plurality of states defined by the code of the application.

5. A computer-implemented method, comprising:
   accessing, by an application development environment, code of an application;
   creating a first base model of the application using the code, the base model representing the underlying code of the application;
   after creating, receiving input defining a change to the code;
   in response to the change to the code, creating an edited base model of the application representing the underlying code of the application as changed;
   creating a new stateful model of the application by processing the edited base model using a transform to simulate the edited base model to a state, the new stateful model representing the appearance of the application when in the state;
   accessing a previous stateful model of the application, the previous stateful model representing a simulation of the first base model to the state and representing the appearance of the application, prior to the change, when in the state;
   comparing a node of the new stateful model to a corresponding node of the previous stateful model to identify a change between the new stateful model and the previous stateful model; and
   providing data identifying the change between the new stateful model and the previous stateful model to a client within the application development environment.

6. The method of claim 5,
   wherein the base models are each defined using one or more nodes, wherein the previous and new stateful models are defined using one or more nodes and pointers, each node in the new stateful model having a pointer to a node in the edited base model and each node in the previous stateful model having a pointer to a node in the first base model, wherein comparing the node of the new stateful model to a corresponding node of the previous stateful model comprises determining if the pointer of the node of the new stateful model and the pointer of the corresponding node of the new stateful model point to the same node in a base model.

7. The method of claim 6, wherein providing data identifying the change comprises providing a change list, the change list identifying at least one of:
- a new node, the new node being a node in the new stateful model that was not in the previous stateful model,
- a deleted node, the deleted node being a node in the previous stateful model that did not have a corresponding node in the new stateful model, or
- a modified node, the modified node being a node in the previous stateful model having a corresponding node in the new stateful model, but pointing to a different node in a base model.

8. The method of claim 5, wherein the state is one of a plurality of states defined by the code of the application.

9. A computer program product comprising a non-transitory computer-readable medium embodying program code, the program code comprising:
- code for accessing, by an application development environment, code of an application;
- code creating a first base model of the application using the accessed code of the application, the base model representing the underlying code of the application;
- code for receiving, after creating, input defining a change to the code of the application;
- code for creating, in response to the change to the code of the application, an edited base model of the application representing the underlying code of the application as changed;
- code for creating a new stateful model of the application by processing the edited base model using a transform to simulate the edited base model to a state, the new stateful model representing the appearance of the application when in the state;
- code for accessing a previous stateful model of the application, the previous stateful model representing a simulation of the first base model to the state and representing the appearance of the application, prior to the change, when in the state;
- code for comparing a node of the new stateful model to a corresponding node of the previous stateful model to identify a change between the new stateful model and the previous stateful model; and
- code for providing data identifying the change between the new stateful model and the previous stateful model to a client within the application development environment.

10. The computer program product of claim 9,
wherein the base models are each defined using one or more nodes,
wherein the previous and new stateful models are defined using one or more nodes and pointers, each node in the new stateful model having a pointer to a node in the edited base model and each node in the previous stateful model having a pointer to a node in the first base model,
wherein comparing the node of the new stateful model to a corresponding node of the previous stateful model comprises determining if the pointer of the node of the new stateful model and the pointer of the corresponding node of the new stateful model point to the same node in a base model.

11. The computer program product of claim 10, wherein providing data identifying the change comprises providing a change list, the change list identifying at least one of:
- a new node, the new node being a node in the new stateful model that was not in the previous stateful model,
- a deleted node, the deleted node being a node in the previous stateful model that did not have a corresponding node in the new stateful model, or
- a modified node, the modified node being a node in the previous stateful model having a corresponding node in the new stateful model, but pointing to a different node in a base model.

12. The computer program product of claim 9, wherein the state is one of a plurality of states defined by the code of the application.

* * * * *